May 25, 1926.
C. E. GOODYEAR
WHEEL
Filed July 10, 1925
1,586,425
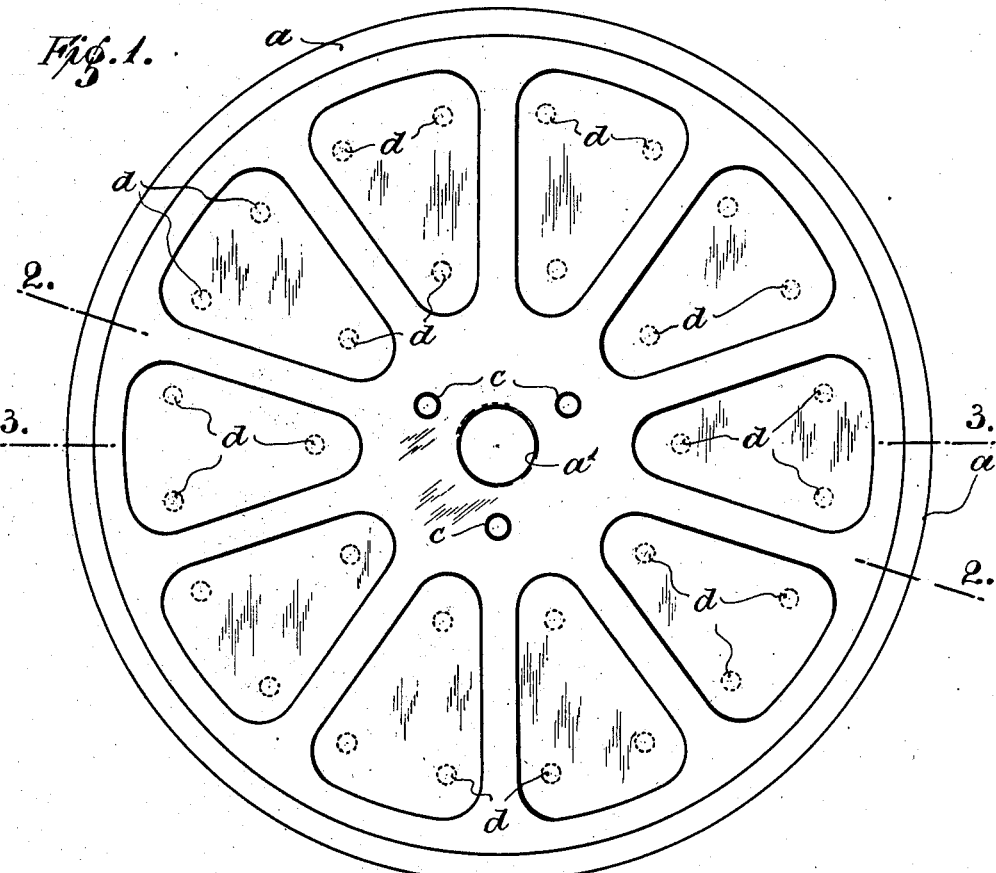
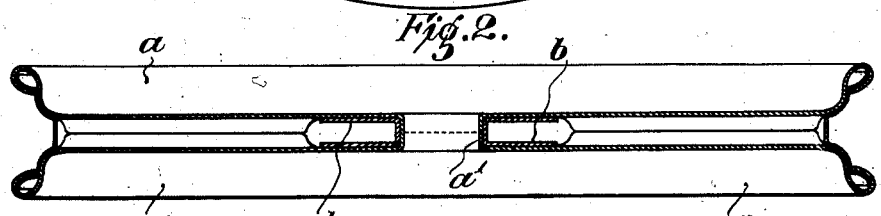
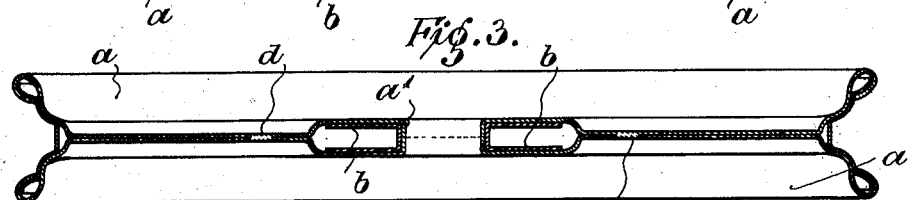

Patented May 25, 1926.

1,586,425

UNITED STATES PATENT OFFICE.

CLAUDE EUGENE GOODYEAR, OF KIDDERMINSTER, ENGLAND.

WHEEL.

Application filed July 10, 1925. Serial No. 42,789.

This invention comprises certain improvements in or relating to wheels such as the road wheels of vehicles and to the manufacture thereof, and it refers particularly to wheels composed of sheet metal and incorporating two sheaves or half-members divided at the mid-plane of the wheel and joined permanently.

It has been the practice in connection with this type of wheel to cut segmental openings between the spokes, and by a flame welding process to joint the sheaves around the boundaries of these segmental openings.

It is the object of the present invention to simplify and cheapen the cost of manufacture of a wheel of this kind and to increase its strength, and with these objects in view the present invention comprehends a wheel of this type wherein integral webs are provided between the spoke formations of the finished wheel. These integral web formations appertaining to the respective sheaves or half members thus provide between the several spokes strengthening portions of thickness approximately double that of the sheet metal of which the sheaves are composed, and in order effectually to secure the sheaves together these webs are welded or secured together, as for instance by a process of spot or other welding or in an alternative embodiment of the invention by roller welding.

In order that this invention may be clearly understood and readily carried into practice reference may be had to the appended drawings, on which—

Figure 1 is a face view of a wheel constructed according to the present invention.

Figure 2 is a section on line 2—2 of Figure 1.

Figure 3 is a section on line 3—3 of Figure 1.

In a convenient embodiment of the present invention, the sheaves or half-members $a$ $a$ of the wheel are coupled together at the rim portion of the wheel in any approved manner. According to one embodiment of the invention they are coupled together in the manner described in my patent application No. 42,788.

After having been thus coupled together the sheaves may be secured together in the vicinity of the hub in any approved manner, preferably according to my copending patent application Serial Number 42,790.

In the construction shown the sheaves $a$ are inturned at $a^1$ so that they meet at the mid-plane of the wheel at which point they are welded together, the liners $b$ are inserted to reinforce this mid-part of the wheel. Through this mid-part of the wheel openings $c$ are provided and fitted with bushes for the reception of the fastening studs usual in connection with detachable wheels of this general character. The sheaves having thus been secured together with the webs between the spokes in intimate contact with each other, these webs are subjected to a process of spot electric welding. Within each substantially triangular formation between the spokes three spot welding processes may be applied at points $d$ in the regions of the respective vertices of the triangles.

Alternatively, however, I may provide a roller welding process, the rollers being applied at each side of the wheel and passed around or substantially around the boundary of each of the duplex webs between the spoke formations.

The webs may in a still further alternative be secured by a process of mechanical riveting, but the welding process serves effectually to exclude moisture and to ensure a watertight formation of the spoked portion of the wheel.

In order to accommodate the tire valve the latter may be adapted to pass through a perforation provided in one side of the well occurring in the center of the rim formation forming subject of my application No. 42,788. It will, however, be appreciated that this invention is not limited to the rim formation according to my application No. 42,788 as it equally may be utilized in connection with other rim constructions, such for instance as may be provided with hook-like formations at the sides for the reception of beaded tires.

Having described my invention, what I claim and desire to secure by Letters Patent is:—

A wheel such as the road wheel of a vehicle of the type composed of sheet metal and incorporating two sheaves or half-members divided at the mid-plane of the wheel and joined permanently, having integral webs between spoke formations, which integral webs are welded or secured together.

In testimony whereof I hereunto affix my signature.

C. E. GOODYEAR.